United States Patent [19]

Norwood

[11] Patent Number: 4,977,856
[45] Date of Patent: Dec. 18, 1990

[54] RAPID EXIT PARLOR SYSTEM

[75] Inventor: Eugene E. Norwood, Goldthwaite, Tex.

[73] Assignee: Dairyland Automation, Inc., Sulphur Springs, Tex.

[21] Appl. No.: 275,897

[22] Filed: Nov. 25, 1988

[51] Int. Cl.⁵ ............................................. A01K 1/12
[52] U.S. Cl. ................................. 119/14.03; 119/27
[58] Field of Search .................. 119/14.03, 27, 147.1, 119/148

[56] References Cited

U.S. PATENT DOCUMENTS

| | | | |
|---|---|---|---|
| 2,904,002 | 9/1959 | Ferris | 119/14.03 |
| 3,863,604 | 2/1975 | Nielsen | 119/148 |
| 3,885,528 | 5/1975 | Vandenberg | 119/14.03 |
| 4,129,096 | 12/1978 | Nickel | 119/27 |
| 4,419,961 | 12/1983 | Vandenberg et al. | 119/14.03 |
| 4,715,321 | 12/1987 | Vandenberg et al. | 119/14.03 |
| 4,763,605 | 8/1988 | Braum | 119/14.03 |

FOREIGN PATENT DOCUMENTS 0189954 8/1986 European Pat. Off. ......... 119/14.03

*Primary Examiner*—Paul J. Hirsch
*Attorney, Agent, or Firm*—John M. Harrison

[57] ABSTRACT

A rapid exit parlor system for milking cows, which includes a parlor frame mounted on a concrete floor having a centrally oriented milking pit, which frame includes at least one entry for receiving cattle in single file, multiple entry panels mounted on rotatable entry panel posts provided in spaced relationship in the parlor frame for guiding the cows into individual stall-like spaces or milking locations for milking purposes and a system of multiple, rapid egress roll gates for releasing the cows from the milking locations in concert. The system of roll gates terminates one end of the milking locations and a curved waste-collecting trough defines the opposite end of the milking locations. The Z-shaped roll gates are designed to rotate in concert when each milking operation is completed, to facilitate rapid egress of the cows from the milking locations and the roll gates are then rotatably repositioned for entry of additional cows into the rapid exit parlor system. Spaced divider boards serve to group the cows in a selected number of isolated milking locations to better facilitate ingress and egress of the cows to and from the rapid exit parlor system.

32 Claims, 4 Drawing Sheets

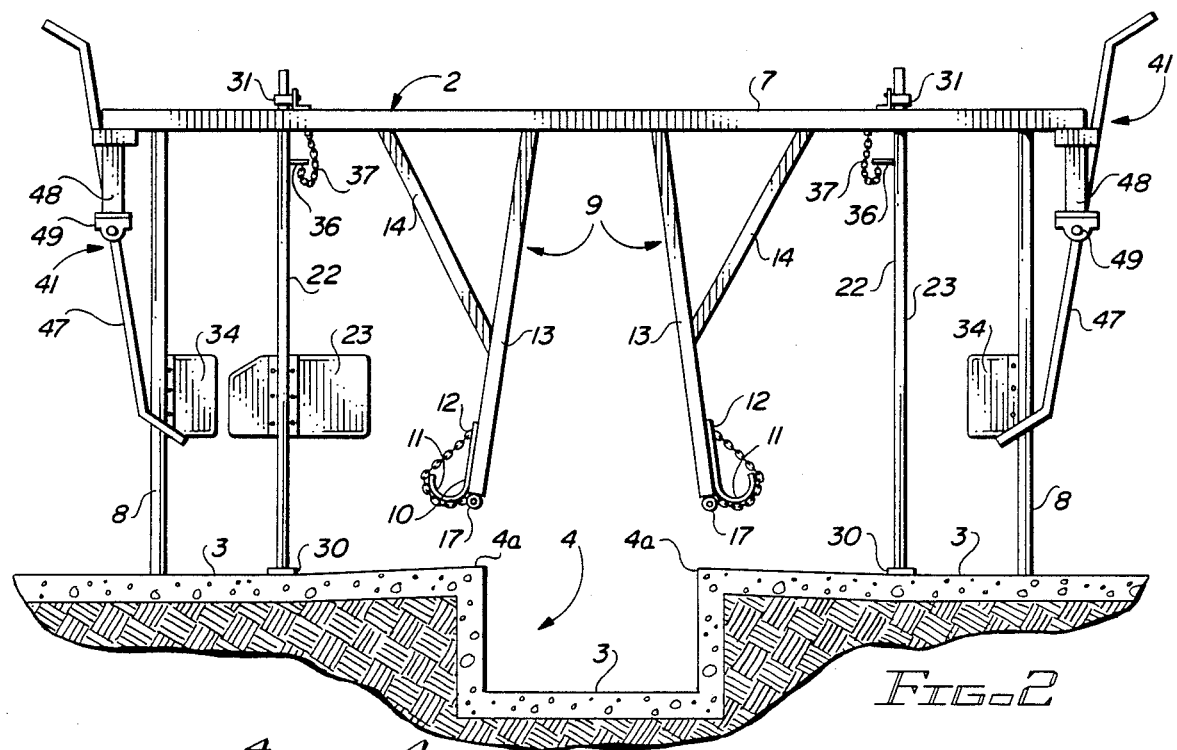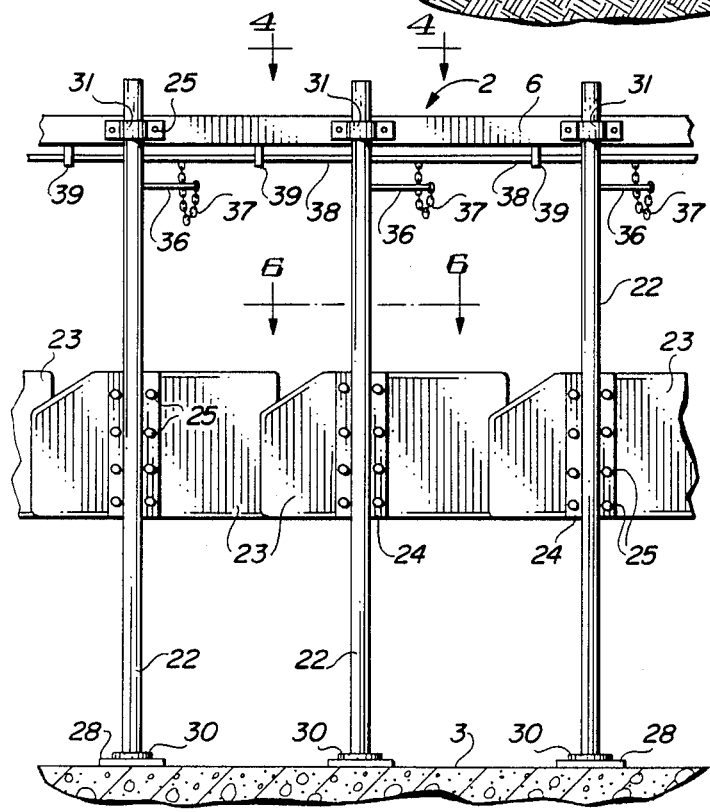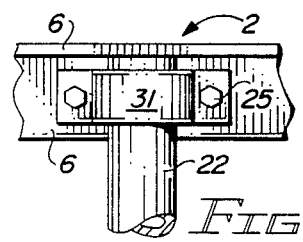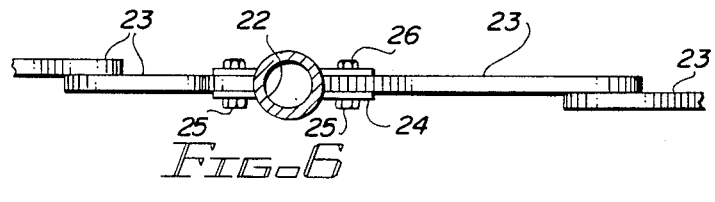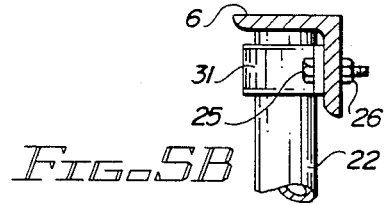

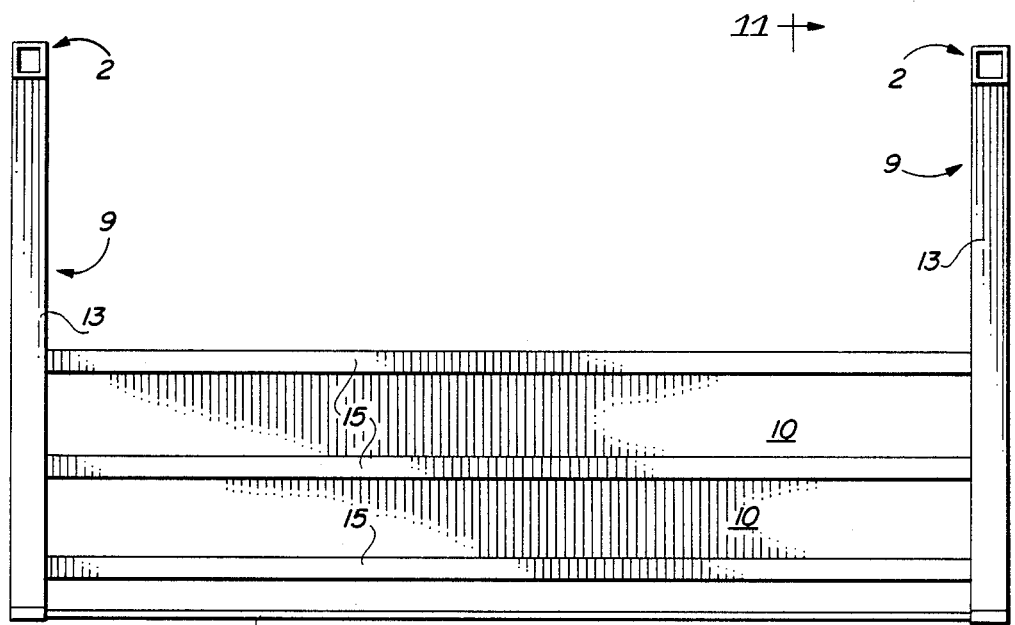
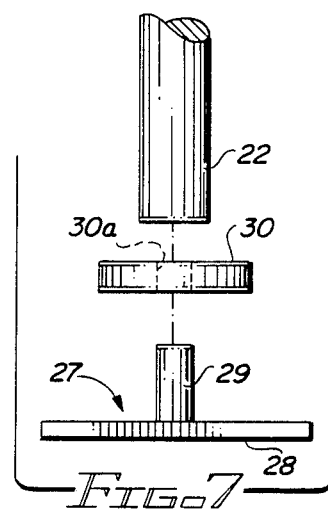
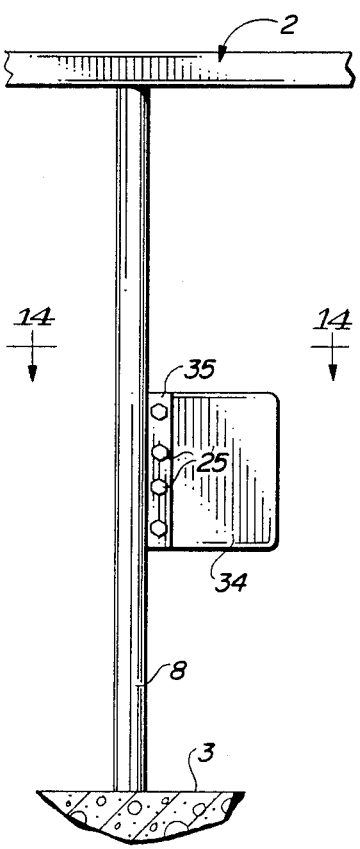
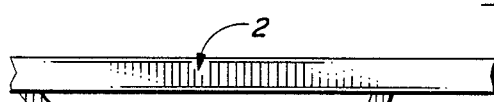
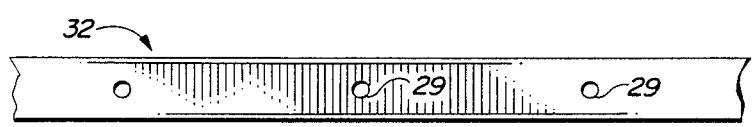
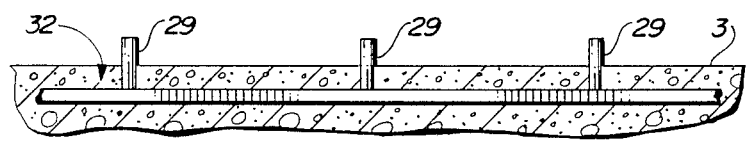

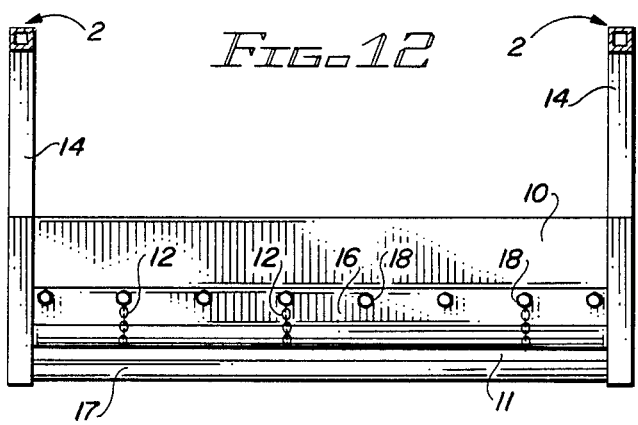
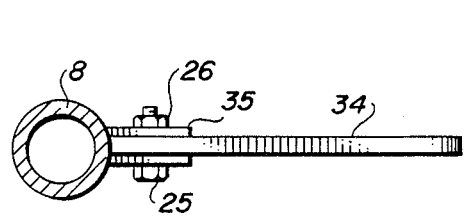
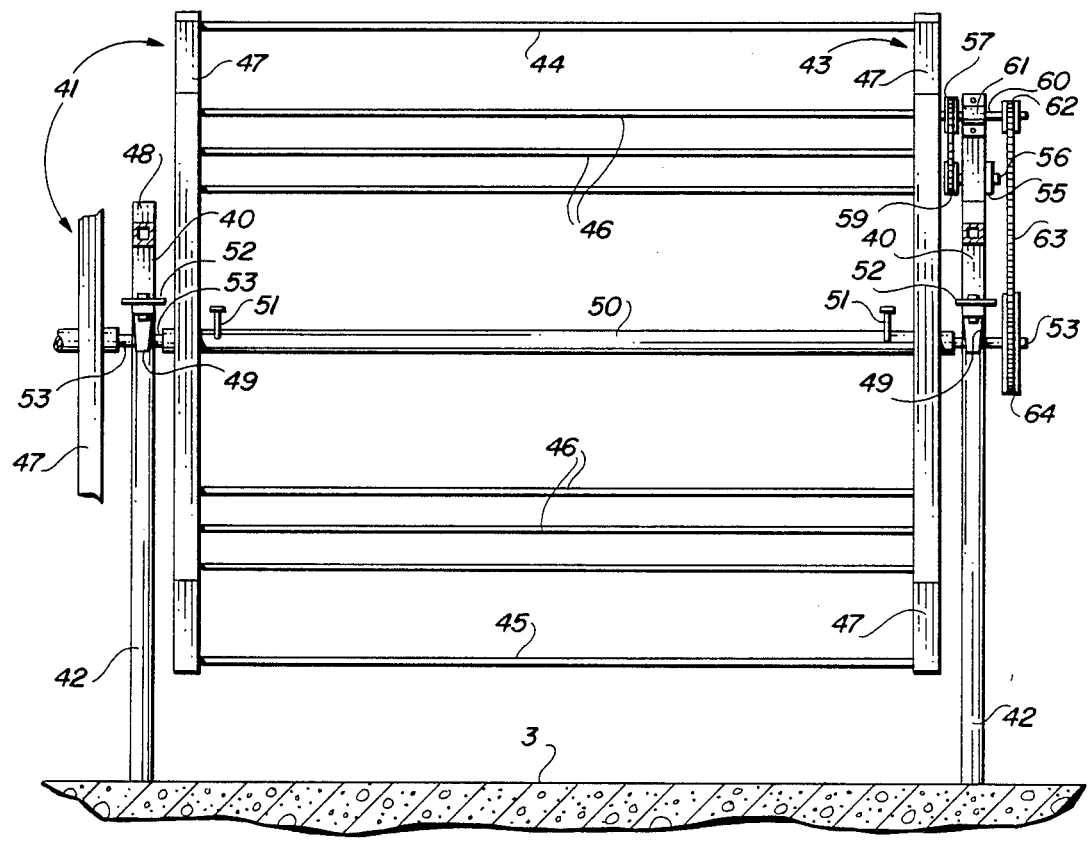
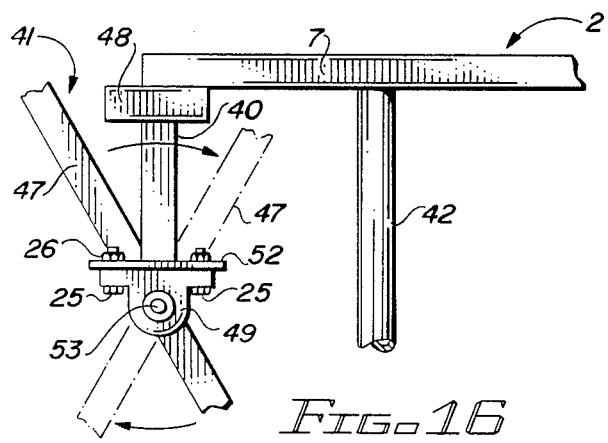
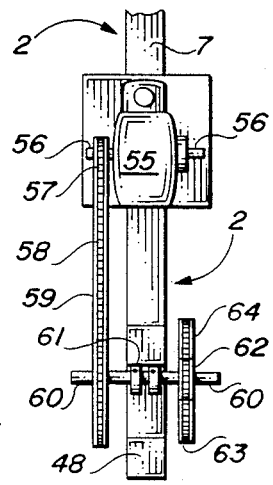

RAPID EXIT PARLOR SYSTEM

BACKGROUND OF THE INVENTION

1. Field of the Invention

This invention relates to milking structures for cows and more particularly, to a rapid exit parlor system which is designed to effect rapid ingress and egress of milk cows for milking purposes. The rapid exit parlor system of this invention is designed for both single and double roll gate configurations wherein the cows enter at a specified point or points and are directed into stall-like openings or milking locations in selected groups by operation of multiple, pivotally mounted entry panels. Multiple groups of cows are maintained in a spaced milking configuration by separate roll gates and each roll gate is operated in concert with the adjacent roll gate to facilitate egress of the cows from the milking locations when the milking procedure is completed. A collecting trough is provided rearwardly of the cows and spaced from the roll gates, in order to collect waste during the milking operation and a milking pit is located between parallel collecting troughs in the double rapid exit parlor system design, in order to handle the milking equipment and provide optimum access to the cows by milking personnel. In a preferred embodiment of the invention the rapid exit parlor system is designed to accommodate groups of five cows per roll gate and may, for example, be designed in size from a "double five", which handles 10 cows, to a "double fifty", which handles 100 cows. In another preferred embodiment of the invention each group of five cows is separated by a fixed divider board which is located opposite each end of each roll gate, in order to separate the cows into groups of five.

2. Description of the Prior Art

Various types of structures for milking cows are known in the art. U.S. Pat. No. 2,689,586, dated Sept. 21, 1954, to H. Petri, details a simple V-shaped milking structure which is designed to accommodate three cows, two of which are being milked, while the other is washed. A "Vacuum Container Milking System and Apparatus Therefor" is detailed in U.S. Pat. No. 2,742,876, dated Apr. 24, 1956, to G. R. Duncan. The system includes a frame for confining one or more cows during the milking operation and a wheeled cooler for collecting the milk and insuring that the milk is maintained at a desired temperature during and after the milking process. U.S. Pat. No. 2,910,965, dated Nov. 3, 1959, to H. E. Cann, Sr., discloses a "Milking System for Domestic Animals". The milking system includes a milk storage container located in close proximity to multiple milking locations, along with a movable milk collector which is adapted to selectively receive milk from the milking locations, a conveyor mounting the milk collector and a drive mechanism associated with the milk collector for moving the milk collector on the conveyor to a selected milking location and then to the milk storage container. The milk container is adapted to effect discharge of the milk into the milk storage container and thereafter to return along the conveyor to a preselected one of the milking locations. U.S. Pat. No. 3,019,763, dated Feb. 6, 1962, to R. G. Ferris, details a "Mobile Milking House and Milk Room". The patent details a mobile milking unit provided with wheels and a housing forming an enclosure for a platform supported by the wheels, such that the milking unit can be towed on the highway. The unit includes multiple stalls arranged to hold cows standing at an angle to a side wall housing and an operator's pit is provided along the rear of the stalls within the enclosure at a level beneath the platform to facilitate use of milking machines. Multiple mangers mounted on one side wall of the enclosure are adapted for feeding cows located in the mobile milking unit. A "Method of Feeding Dairy Cows" is detailed in U.S. Pat. No. 3,168,888, dated Feb. 9, 1965, to M. S. Brodrick. The method includes a "Milk Production Center" where multiple cows may be arranged in such a manner that maximum production of milk is insured with minimum cost. The method includes the steps of restraining the cow in an enclosed habitat area, providing the cow with an unlimited quantity of feed and permitting the cow random, unlimited access to the feed in a dispenser. A "Milking System" is detailed in U.S. Pat. No. 3,460,515, dated Aug. 12, 1969, to R. E. Paige, et al. The milking system is designed such that a radial gate sweeps a circular corral like the hand of a clock to herd successive groups of cattle into a lane leading into a first zone designed for washing and feeding the cows. Successive cages mounted on an overhead conveyor are lowered to isolate the cows and force them to walk through a series of water sprays while the cows feed from troughs in the cages. The moving cages then enter a milking zone where the cows stand on a conveyor platform synchronized with the cages, with individual traveling milking units coupled to the cows. U.S. Pat. No. 3,885,528, dated May 27, 1975, to Ben W. Vandenburg, details a "Rapid Exit Milking Barn". The milking barn includes multiple milking stations designed to receive individual cows and permit ingress and egress to the stations. Multiple secondary egress means is provided which facilitates rapid egress of the cows from the individual milking stations. The rapid egress means in one embodiment of the invention includes gates communicating with alternate ones of the milking station to permit the cows to rapidly exit from the individual milking stations. U.S. Pat. No. 4,419,961, dated Dec. 13, 1983, to Vandenburg, et al, details a "Milking Parlor Construction", which includes a modular unit utilizing milking parlors having a central milking pit area. Each of the modules includes a vertical member, from which vertical member a feed bowl and individual cattle feeding station gates are hung. A feed conveyor communicates with the vertical member and has a feed chute terminating in the feed bowl, wherein feed may be fed to the feed bowl of each of the cattle stations. U.S. Pat. No. 4,715,321, dated Dec. 29, 1987, to Vandenburg, et al, details a "Milking Parlor Stall Construction with Overhead Gates". The patent includes a milking parlor construction which features the combination of a modular unit having a module that may be utilized in fabricating milking parlors of the type wherein a central pit area is located on either side of a cattle stand. Each of the modules includes at least two spaced-apart, hollow, vertical upright members that are supported in concrete and receive a feed bowl and a shroud. The feed bowl is provided with feed from a feed conveyor located over the hollow vertical upright member and in communication therewith. The module also includes at least one pair of vertically operable gates attached to the vertical upright members and a mechanism is provided for raising and lowering the gates. One or a plurality of the gates define a cattle station at which the cattle are milked and fed and provides easy egress for the cattle to the exiting corridor of the milking parlor structure. U.S.

Pat. No. 3,603,292, dated Sept. 7, 1971, to Nigel Finch, details an "Automated Stall and Milking Equipment". The patent discloses a milking parlor which has forked entry passage feeding two rows of stalls. The passage has an entry separated from each of two outlet legs, respectively, leading to the two rows of stalls by a vertically-slidable, guillotine-type gate. The exit from each of the outlet legs is controlled by a gate which is also of vertically-slidable, guillotine design. Each stall includes a milk-controlled cup and claw moving equipment having an articulated linkage arm which moves the claw relative to a j support. Other patents detailing various types of milking stalls and milking parlors are as follows: U.S. Pat. No. 3,703,884, dated Nov. 28, 1972, to Richard E. Maddalena; U.S. Pat. No. 3,762,370, dated Oct. 2, 1973, to Grant L. Gulleson; U.S. Pat. No. 4,207,837, dated June 17, 1980, to Merle C. Schwartau; and U.S. Pat. No. 4,362,127, dated Dec. 7, 1982, to Floyd P. Nielsen, et al.

An object of this invention is to provide a new and improved rapid exit parlor system for milking cattle which incorporates optimum efficiency in deployment of cattle per square foot of space, with a complete turnover in cattle ingress and egress facilitated in a minimum time period.

It is another object of the invention to provide single and double-entry rapid exit parlor systems for milking cows, wherein spaced pivoting entry panels serve to successively guide the cows into individual, spaced milking locations and roll gates operate in concert to facilitate simultaneous egress of the cows from the milking locations.

Another object of the invention is to provide single and double-entry rapid exit parlor systems which are designed to accommodate a selected number of cows in spaced groups, with pivoting entry panels located in the entry or entries, for guiding the cows into spaced milking locations within the groups, respectively, and further including a system of roll gates which rotate in concert to facilitate simultaneous, rapid egress of the cows from the milking locations.

Another object of this invention is to provide new and improved, single and double rapid exit parlor systems which are characterized by multiple, Z-shaped roll gates and pivoting entry panels that combine to define multiple milking stations, wherein the roll gates are simultaneously rotated by one or more centrally-located drive mechanisms to facilitate egress of the cows in concert from the milking stations.

Still another object of this invention is to provide single and double-entry, rapid exit parlor systems for milking cows, which parlor systems selectively include a single or double-entryway, multiple, spaced, pivotally-mounted and removable entry panels for guiding groups of cows into individual milking stations and a Z-shaped roll gate defining one end of each of a selected number of milking stations which define each group, such that simultaneous egress of the cows in these groups is facilitated by rotation of the multiple roll gates to the open configuration after the milking operation is completed.

Yet another object of this invention is to provide a new and improved, single or double-entry rapid exit parlor system for milking cows, which system includes a single or double entryway, multiple, pivotally-mounted entry panels disposed in spaced relationship along the path or paths of the cows, in order to direct the cows into milking locations in groups, a roll gate defining one end of each of a selected number of the milking locations to facilitate egress of the cows in concert in the groups pursuant to rotation of the tandem-mounted roll gates; and further including a collecting trough defining the opposite end of the milking stations for collecting waste which accumulates during the milking operation.

SUMMARY OF THE INVENTION

These and other objects of the invention are provided in new and improved, single or double-entry rapid exit parlor systems for milking cows, which parlor systems are characterized by a frame mounted on a concrete slab, with multiple entry panels mounted on pivotable and removable entry panel posts provided in spaced relationship in the frame for guiding the cows into individual milking stations in groups, a roll gate defining one end of each of a selected number of the milking stations which make up each group of cows, to facilitate egress of the cows in concert when the milking operation is completed and a collecting trough located at the opposite end of the milking stations for receiving waste which accumulates during the milking operation.

BRIEF DESCRIPTION OF THE DRAWINGS

The invention will be better understood by reference to the accompanying drawings, wherein:

FIG. 2 is a sectional view taken along line 2—2 of the rapid exit parlor system illustrated in FIG. 1;

FIG. 3 is an entrance view, partially in section, of adjacent, aligned entry panels and entry panel posts, with the entry panels oriented in closed configuration in the rapid exit parlor system illustrated in FIGS. 1 and 2;

FIG. 4 is a top view, partially in section, of a first preferred embodiment for mounting the entry panel posts to the parlor frame;

FIG. 5 is a front view, partially in section, of the preferred mounting embodiment illustrated in FIG. 4;

FIG. 6 is a sectional view taken along line 6—6 of one of the entry panels and companion entry panel post illustrated in FIG. 3;

FIG. 7 is a side exploded view of a preferred post shoe for removably mounting the entry panel posts to the concrete floor;

FIG. 8 is a top view, partially in section, of a post plate utilized for mounting the fixed support post of the parlor frame in the concrete floor;

FIG. 9 is a side view, partially in section, of the post plate illustrated in FIG. 8, embedded in the concrete floor 3;

FIG. 10 is a rear view, partially in section, of a butt plate frame which is suspended from the parlor frame and is designed to carry a butt plate and a collecting trough;

FIG. 11 is a sectional view taken along line 11-11 of the butt plate frame illustrated in FIG. 10;

FIG. 12 is a front view of the butt plate frame, butt plate and collecting trough illustrated in FIGS. 10 and 11;

FIG. 13 is a side view of a divider board and fixed support post used to divide groups of cows in the parlor frame 2;

FIG. 14 is a top sectional view taken along line 14—14 of FIG. 13 of the divider board and post;

FIG. 15 is a front view of a driven roll gate which defines the front end of five of the milking locations in the parlor frame illustrated in FIG. 1;

FIG. 16 is a side view, partially in section, of the roll gate illustrated in FIG. 15; and FIG. 17 is a top view of a preferred drive system for operating the roll gate illustrated in FIGS. 15 and 16.

DESCRIPTION OF THE PREFERRED EMBODIMENTS

Figure 1:
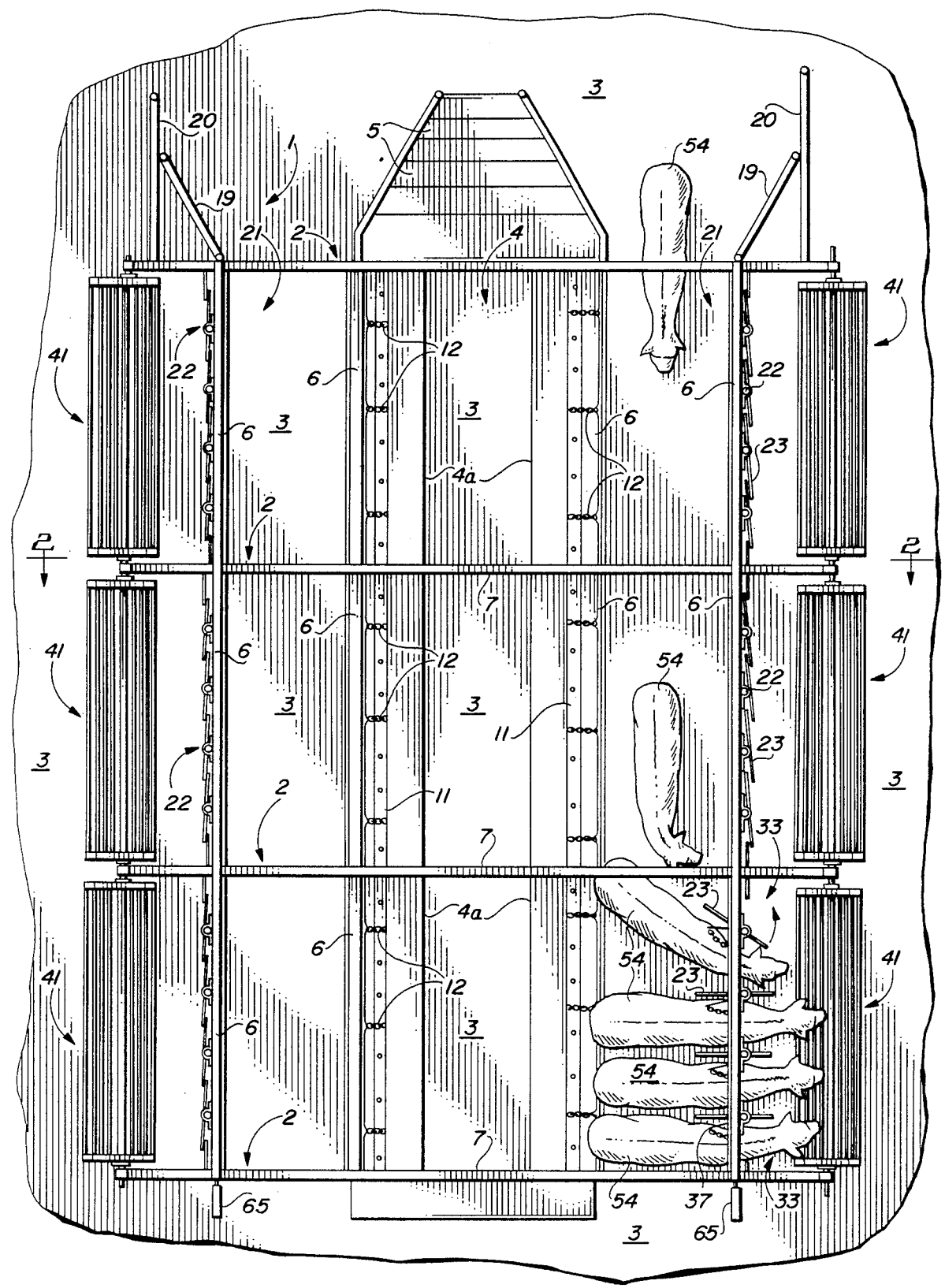
FIG. 1 is a top view of a preferred embodiment of the rapid exit parlor system of this invention.

Referring initially to FIGS. 1 and 2 of the drawings, a rapid exit parlor system of this invention is generally illustrated by reference numeral 1. The double-entry rapid exit parlor system 1 is characterized by a parlor frame 2, mounted on a concrete floor 3 and provided with a depressed milking pit 4, having spaced pit shoulders 4a, extending longitudinally through the center thereof. A series of entry steps 5 is provided adjacent to one end of the milking pit 4 for access by operators of suitable milking apparatus (not illustrated). The parlor frame 2 is further characterized by parallel longitudinal frame members 6 and parallel cross frame members 7, supported by spaced fixed support posts 8 and entry panel posts 22. An entry 21 is provided on either side of the milking pit 4 and the cows 54 approach the rapid exit parlor system 1 at the guide bars 19 and guide bar extensions 20 and enter the parlor frame 2 at each entry 21. The cows 54 continue longitudinally in single file into the parlor frame 2 to individual stalls or milking locations 33, as illustrated in FIG. 1, and fill each of the milking locations 33 one-by-one, in groups of five, with each group of five cows 54 facing a closed roll gate 41. The cows 54 are separated by parallel entry panels 23, which are mounted on the pivoting entry panel posts 22, and open to define the sides of the milking locations 33 when the cows 54 are in milking configuration, as further illustrated in FIG. 1. A collecting trough 11 extends along the entire length of the parlor frame 2 rearwardly of the cows 54 and serves to define the rear end of each of the milking locations 33, as hereinafter further described.

Referring now to FIGS. 1, 2 and 3–7 of the drawings, each of the entry panels 23 are fixedly attached to a companion entry panel post 22 by means of an entry panel bracket 24, which is secured to the corresponding entry panel 23 by means of multiple bolts 25 and cooperating nuts 26, as illustrated in FIGS. 3 and 6. In a preferred embodiment of the invention, the entry panel posts 22 are capped at the top end and are each rotatably secured to a longitudinal frame member 6 of the parlor frame 2 in spaced relationship by means of entry post brackets 31 and cooperating bolts 25 and nuts 26. The bottom ends of the entry panel posts 22 are each pivotally and removably attached to the concrete floor 3 by means of a post shoe 27, which includes a flat shoe plate 28, having an upward-standing, round mount nipple 29. A companion plate spacer 30 is provided with a nipple opening 30a for receiving the mount nipple 29, as illustrated in FIG. 7. Accordingly, the open bottom end of the entry panel post 22 receives the mount nipple 29 of the post shoe 27 and each of the entry panel posts 22 is easily removed from the corresponding longitudinal frame member 6 by lifting the entry panel post 22 from the companion mount nipple 29 in each of the post shoes 27. This action causes the upper end of the entry panel post 22 to slide inside the companion entry post bracket 31 with respect to the longitudinal frame member 6 and raises the attached entry panel 23, which is sometimes necessary if a cow becomes entangled in a milking location 33. Referring now to FIGS. 5a and 5b of the drawing, in an alternative preferred embodiment of the invention the top ends of the entry panel posts 22 are secured to each of the respective longitudinal angle iron frame members 6 in spaced relationship, such that these ends are pressed against the top flange of the longitudinal frame members 6. The securing of the entry panel posts 22 to the angle-iron longitudinal frame members 6 in this manner provides better support for the parlor frame 2. As further illustrated in FIGS. 1, 3 and 6 of the drawings, the entry panels 23 are normally pivoted into lapped, closed configuration by pivoting the respective entry panel posts 22 when the cows 54 first enter the entry 21. As the first cow 54 reaches the end of the parlor frame 2, the cow 54 must turn to its left, thereby pivoting the corresponding entry panel 23 and companion entry panel post 22 to the open configuration, in order to enter the first milking location 33, as illustrated in FIG. 1. The next cow 54 then enters the second milking location 33 by pivoting the second entry panel 23 and the corresponding entry panel post 22, as further illustrated in FIG. 1 and so on, until the cows 54 completely fill both sides of the rapid exit parlor system 1 in groups of five. As illustrated in FIGS. 1–3, each of the entry panel posts 22 is fitted with a projecting post rod 36 and a post chain 37 extends from fixed attachment to the post rod 36 to a panel rotating rod 38, which is slidably suspended in spaced rod hangers 39, secured to the longitudinal frame members 6. One end of each of the panel rotating rods 38 in the parlor frame 2 is attached to an air cylinder 65. This mechanical configuration facilitates closing of the entry panels 23 in concert by simultaneous rotation of the entry panel posts 22 through operation of the air cylinders 65 after the cows 54 exit the respective milking locations 33, as hereinafter further described.

Referring now to FIGS. 2, 8, 9 and 13 of the drawings, the fixed support posts 8 extend from fixed attachment to the concrete floor 3 upwardly to the cross frame members 7 of the parlor frame 2, as illustrated. In a most preferred embodiment of the invention the bottom portion of the fixed support posts 8 are secured to spaced, upward-standing mount nipples 29, fixedly attached to a post plate 32 which is embedded in the concrete floor 3, as illustrated in FIG. 9. Accordingly, when the open bottom ends of the respective fixed support posts 8 are inserted over the companion mount nipples 29 attached to the post plates 32, the top ends of the fixed support posts 8 are then secured to the respective cross frame members 7 by means of entry post brackets 31 in the same manner as the entry panel posts 22, except that the entry post brackets 31 are tightened on the fixed support posts 8 to prevent rotation of the fixed support posts 8. In another preferred embodiment of the invention, divider boards 34 are fixedly mounted to each of the spaced fixed support posts 8 by means of divider board brackets 35, companion bolts 25 and nuts 26, in order to space the cows 54 located in the respective milking station locations 33, illustrated in FIG. 1, into groups of five each. For example, a divider board 34 is fixedly attached to each of the fixed support post 8 at the point where each of the spaced cross frame members extend between the respective roll gates 41, for supporting the roll gates 41 in side-by-side relationship in the parlor frame 2.

Referring now to FIGS. 2 and 10–12 of the drawings, in yet another preferred embodiment of the invention multiple butt plate frames 9 extend downwardly in spaced, angular relationship from fixed attachment to the cross frame members 7 of the parlor frame 2 on each side of the milking pit 4, in order to shape the rear boundary of the respective milking locations illustrated in FIG. 1. Each butt plate frame 9 is further characterized by a butt plate support 13 having one end welded or otherwise fixedly attached to a corresponding cross frame member 7 of the parlor frame 2, with the opposite ends of the butt plate support 13 terminated by a terminal bar 17, which is welded or otherwise attached to the butt plate support 13. A butt plate brace 14 is welded to each butt plate support 13 and to the corresponding cross frame member 7, in order to further brace the butt plate support 13 in the illustrated downwardly-extending configuration. A butt plate 10 is bolted or otherwise secured to a pair of spaced butt plate stringers 15, welded or otherwise secured to the spaced butt plate supports 13, as illustrated in FIG. 10. Furthermore, a flexible collecting trough 11 is bolted to the butt plate 10 by means of a chain mount plate 16 and companion mount plate bolts 18 and is shaped upwardly in a trough-like configuration by means of parallel chain segments 12, as illustrated in FIGS. 2, 11 and 12. Accordingly, referring again to FIG. 1 of the drawings, it will be appreciated that when the cows 54 are aligned in the respective milking locations 33, the cows 54 are prevented from moving rearwardly by the collecting trough 11 and are positioned such that waste from the cows 54 will be deposited in the collecting trough 11, where it can be washed to one end of the parlor frame 2 and collected for disposal.

Referring now to FIGS. 1 and 15-17, the exit end of the respective milking locations 33 is defined by the spaced roll gates 41, each of which roll gates 41 is detailed in FIG. 15. Each of the roll gates 41 is characterized by a pair of gate supports 42, which are spaced in perpendicular relationship and receive one end of a roll gate rod 53, which extends through a central bar 50 that represents the longitudinal center-line of each roll gate frame 43. A pair of Z frames 47 are welded or otherwise fixedly attached to each end of the central bar 50 and multiple, spaced interior frame bars 46 extend between the parallel Z frames 47, in order to configure each roll gate frame 43 and stabilize the roll gates 41. A top frame bar 44 spaces the Z frames 47 at one end and a bottom frame bar 45 spaces the Z frames 47 at the opposite end, to further stiffen the roll gates 41. A pair of bar set bolts 51 are threadibly inserted in each end of the central bar 50, in order to threadibly seat against the roll gate rod 53 and facilitate rotation of each roll gate 41 with the roll gate rod 53, as hereinafter further described. In another preferred embodiment of the invention, the roll gate rod 53 extends through a pair of bracket bearings 49, mounted on bearing mount plates 52, which are welded to extensions 40, projecting downwardly from roll gate brackets 48, mounted on the cross frame members 7, respectively, in order to facilitate smooth rotation of the roll gate rod 53 and the roll gates 41 with respect to the parallel gate supports 42. This rotation results from operation of a drive motor 55, which is mounted on a centrally-located cross frame member 7 of the parlor frame 2, as detailed in FIG. 17 and as hereinafter further described. It will be appreciated from a consideration of FIGS. 1 and 15 of the drawings that the spaced roll gates 41 are mounted on a common roll gate rod 53 which extends through the spaced bracket bearings 49, such that driving of the center ones of the roll gates 41 by the drive motor 55 causes each of the roll gates 41 to rotate in concert. This orchestrated rotation of the roll gates 41 is effected by a drive shaft 56, extending from the drive motor 55, a drive sprocket 57 attached to the drive shaft 56 and a drive chain 58, which connects the drive sprocket 57 to a driven sprocket 59. The driven sprocket 59 is in turn secured to a powered shaft 60, which is rotatably mounted in a power shaft bearing 61, as illustrated in FIGS. 15 and 17. A power sprocket 62 is attached to the opposite extending end of the power shaft 60 and is secured in driving relationship to corresponding roll gate sprocket 64, mounted on the roll gate rod 53, by means of a power chain 63, as further illustrated in FIG. 15. It will be appreciated that the extending end of the roll gate rod 53 may be attached to another length of roll gate rod (not illustrated) for mounting and operating an adjacent roll gate (not illustrated). Accordingly, it will be appreciated that operation of the drive motor 55 effects rotation of the roll gate rod 53 and each roll gate 41 in concert, as heretofore described.

In operation, and referring again to the drawings, a number of cows 54 are first directed into the double-entry rapid exit parlor system 1 through the dual entries 21. When the lead cow 54 locates in the first one of the milking locations 33 at the extreme end of the parlor frame 2 as illustrated in FIG. 1, successive cows 54 follow in single file and enter each of the remaining spaced milking locations 33 in parallel relationship. As each of the cows 54 turns into the respective milking locations 33, the companion entry panel 23 is rotated or pivoted with its corresponding entry panel post 22, from the position illustrated in FIGS. 3 and 6 to the position illustrated in FIG. 1, at the lower end of the drawing. Accordingly, when each of the milking locations 33 in the parlor frame 2 is occupied, the cows 54 are thusly grouped into six groups of five each, each group of five cows 54 being serviced by a single roll gate 41 and the respective entry panels 23 are oriented in open, parallel configuration. The milking operation is then commenced and waste deposits from the cows 54 accumulate in the collecting troughs 11 which parallel each other and are spaced by the milking pit 4. These collecting troughs 11 are periodically hosed and cleaned and the deposits collected at one end thereof. When the milking operation is completed, each drive motor 55 is activated by appropriate switch means (not illustrated) and connecting wiring (not illustrated) to effect rotation of the roll gates 41 in concert to a position approximately parallel to the concrete floor 3. This rotational orientation of the roll gates 41 allows the cows 54 to rapidly and without impediment, exit the respective milking locations 33 and the parlor frame 2 from both sides. Additional activation of the controls which operate the drive motor 55 causes the roll gates 41 to continue rotation in concert back into the position illustrated in FIGS. 1 and 15, to contain an additional group of cows which are then allowed to enter the entry 21 as heretofore described.

Referring now to FIGS. 2 and 3 of the drawings, as the roll gates 41 are caused to rotate from the horizontal, open configuration back into the substantially vertical, closed configuration illustrated in FIGS. 1, 2 and 15, and after the cows 54 have exited the parlor frame 2, the panel rotating rod 38 is caused to slide linearly in the rod hangers 39 to extend the respective post chains 37 and rotate the entry panel posts 22 in concert in the respective entry post brackets 31 and post shoes 27, to close the entry panels 23 into the lapped positions illustrated in FIGS. 3 and 6. This operation is effected by operation of the air cylinders 65, illustrated in FIG. 1, and places the entry panels 23 back into receiving configuration for the next group of cows 54.

It will be appreciated by those skilled in the art that the drive motor 55 may be of any suitable design which will operate to rotate the roll gates 41 in concert according to the knowledge of those skilled in the art. However, in a most preferred embodiment of the invention, in order to avoid the hazard of electrical shock, the drive motor 55 is characterized by an air-operated motor of suitable design. Alternatively, the drive motor 55 may be hydraulically or electrically operated and in the latter case, suitable insulation precautions should be taken to prevent accidental shocking of the cows 54.

It will be further appreciated by those skilled in the art that the rapid exit parlor system 1 can be designed with a single entry 21, utilizing only the right or left half of the parlor frame illustrated in FIG. 2. Furthermore, while FIG. 1 illustrates the grouping of five cows between each of the divider boards 34 and served by a single roll gate 41, fewer or more cows 54 may be similarly grouped together, according to the desires of the designer. Depending upon the desired grouping of the cows 54, the roll gates 41 must be proportional in length to this grouping, in order to service the desired number of cows 54 as a unit.

As heretofore noted, the size of the rapid exit parlor system 1 and therefor the parlor frame 2, can be varied, depending upon the desired number of cows 54 to be milked simultaneously. Typically, as heretofore described, the rapid exit parlor system 1 can be characterized by either a double or single-entry system and may be designed from a "double five" to a "double fifty", which systems will accommodate from 10 to 100 cows, respectively. According to this designation, the rapid exit parlor system illustrated in FIG. 1 is a "double fifteen" system, which will acommodate 30 cows in a single milking.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A rapid exit parlor system for milking cows comprising a structure adapted to receive the cows, a plurality of pivoting entry panel means provided in said structure in spaced relationship, said pivoting entry panel means adapted to open and define spaced milking locations responsive to the passage of cows in sequence between said pivoting entry panel means into said milking locations, and roll gate means defining one end of said milking locations, said roll gate means horizontally rotatably mounted in said structure between a vertically closed position for containing the cows in said milking locations and a horizontally open position for releasing the cows from said milking locations.

2. The rapid exit parlor system of claim 1 further comprising drive means operably connected to said roll gate means for rotating said roll gate means into a selected one of said closed position and said open position.

3. The rapid exit parlor system of claim 1 further comprising a plurality of divider boards provided in said structure in spaced relationship, said divider boards spacing a selected number of said pivoting entry panel means and said milking locations and releasing the cows from said selected number of said milking locations responsive to operation of said roll gate means.

4. The rapid exit parlor system of claim 1 further comprising:
   (a) drive means operably connected to said roll gate means for rotating said roll gate means into a selected one of said closed position and said open position; and
   (b) a plurality of divider boards provided in said structure in spaced relationship, said divider boards spacing a selected number of said pivoting entry panel means and said milking locations and releasing the cows from said selected number of said milking locations responsive to operation of said roll gate means.

5. The rapid exit parlor system of claim 1 further comprising collecting means provided in said structure in spaced relationship with respect to said roll gate means, said collecting means defining the opposite end of said milking locations, for collecting waste from the cows.

6. The rapid exit parlor system of claim 1 further comprising:
   (a) drive means operably connected to said roll gate means for rotating said roll gate means into a selected one of said closed position and said open position;
   (b) a plurality of divider boards provided in said structure in spaced relationship, said divider boards spacing a selected number of said pivoting entry panel means and said milking locations and releasing the cows from said selected number of said milking locations responsive to operation of said roll gate means; and
   (c) collecting means provided in said structure in spaced relationship with respect to said roll gate means, said collecting means defining the opposite end of said milking locations, for collecting waste from the cows.

7. The rapid exit parlor system of claim 6 wherein said milking locations, said entry panel means, said divider boards, said drive means, said roll gate means and said collecting means are arranged on one side of said structure to define a single-entry rapid exit parlor system.

8. The rapid exit parlor system of claim 6 wherein said milking locations, said entry panel means, said divider boards, said drive means, said roll gate means and said collecting means are arranged on opposite sides of said structure in spaced relationship to define a double-entry rapid exit parlor system.

9. The rapid exit parlor system of claim 5 further comprising a milking pit extending rearwardly of said collecting means.

10. The rapid exit parlor system of claim 9 further comprising:
   (a) drive means operably connected to said roll gate means for rotating said roll gate means into a selected one of said closed position and said open position; and
   (b) a plurality of divider boards provided in said structure in spaced relationship, said divider boards spacing a selected number of said pivoting entry panel means and said milking locations and releasing the cows from said selected number of said milking locations responsive to operation of said roll gate means.

11. The rapid exit parlor system of claim 1 wherein said pivoting entry panel means further comprises a plurality of entry panel posts pivotally carried by said structure and entry panels fixedly attached to said entry panel posts, respectively, whereby said entry panels are pivoted from a closed position to an open position with respect to said structure responsive to contact with said entry panels by a cow entering said milking locations, respectively.

12. The rapid exit parlor system of claim 1 wherein said roll gate means further comprises at least two roll gates rotatably mounted in concert in side-by-side relationship in said structure.

13. The rapid exit parlor system of claim 1 wherein:
(a) said pivoting entry panel means further comprises a plurality of entry panel posts pivotally carried by said structure and entry panels fixedly attached to said entry panel posts, respectively, whereby said entry panels are pivoted from a closed position to an open position with respect to said structure responsive to contact with said entry panels by a cow entering said milking locations, respectively; and
(b) said roll gate means further comprises at least two roll gates rotatably mounted in concert in side-by-side relationship in said structure.

14. The rapid exit parlor system of claim 13 further comprising:
(a) drive means operably connected to at least one of said roll gates for rotating said roll gates into a selected one of said closed position and said open position; and
(b) a plurality of divider boards provided in said structure in spaced relationship, said divider boards spacing a selected number of said pivoting entry panels and said milking locations and releasing the cows from said selected number of said milking locations responsive to operation of said roll gates.

15. The rapid exit parlor system of claim 1 wherein said roll gate means further comprises at least two roll gates rotatably mounted in concert in oppositely-disposed, spaced relationship in said structure and further comprising drive means operably connected to at least one of said roll gates for rotating said roll gates into a selected one of said closed position and said open position.

16. The rapid exit parlor system of claim 1 wherein:
(a) said pivoting entry panel means further comprises a plurality of entry panel posts pivotally carried by said structure and entry panels fixedly attached to said entry panel posts, respectively, whereby said entry panels are pivoted from a closed position to an open position with respect to said structure responsive to contact with said entry panels by cows entering said milking locations, respectively; and
(b) said roll gate means further comprises at least two roll gates rotatably mounted in oppositely-disposed, spaced relationship in concert in said structure.

17. The rapid exit parlor system of claim 16 further comprising:
(a) drive means operably connected to said roll gates for rotating said roll gates into a selected one of said closed position and said open position; and
(b) a plurality of divider boards provided in said structure relationship, said divider boards spacing a selected number of said pivoting entry panels and said milking locations and releasing the cows from said selected number of said milking locations responsive to operation of said roll gates.

18. A rapid exit parlor system for milking cows comprising a structure adapted to receive the cows; a plurality of pivoting entry panel means provided along at least one side of said structure in spaced relationship, said pivoting entry panel means adapted to open and define spaced milking locations responsive to the passage of cows in sequence between said pivoting entry panel means into said milking locations; a plurality of roll gate means defining one end of selected groups of said milking locations, said roll gate means horizontally mounted in said structure for rotation in concert between a vertically closed position for containing the cows in said milking locations and a horizontally open position for releasing the cows from said milking locations; and collecting means provided in said structure in spaced relationship with respect to said roll gate means, said collecting means defining the opposite end of said milking locations, for collecting waste from the cows.

19. The rapid exit parlor system of claim 18 further comprising:
(a) drive means operably connected to said roll gate means for rotating said roll gate means into a selected one of said closed position and said open position; and
(b) a plurality of divider boards provided in said structure in spaced relationship, said divider boards spacing a selected number of said pivoting entry panel means and said milking locations and releasing the cows from said selected number of said milking locations responsive to operation of said roll gate means.

20. The rapid exit parlor system of claim 19 wherein said milking locations, said entry panel means, said divider boards, said drive means, said roll gate means and said collecting means are arranged on one side of said structure to define a single-entry rapid exit parlor system.

21. The rapid exit parlor system of claim 19 wherein said milking locations, said entry panel means, said divider boards, said drive means, said roll gate means and said collecting means are arranged on opposite sides of said structure in spaced relationship to define a double-entry rapid exit parlor system.

22. The rapid exit parlor system of claim 19 further comprising a milking pit extending rearwardly of said collecting means.

23. The rapid exit parlor system of claim 22 wherein said pivoting entry panel means further comprises a plurality of entry panel posts pivotally carried by said structure and entry panels fixedly attached to said entry panel posts, respectively, whereby said entry panels are pivoted from a closed position to an open position with respect to said structure responsive to contact with said entry panels by a cow entering said milking locations, respectively.

24. The rapid exit parlor system of claim 23 wherein said roll gate means further comprises at least two roll gates rotatably mounted in side-by-side relationship in said structure.

25. A double-entry rapid exit parlor system for milking cows comprising a structure having a first entry and a second entry adapted to receive the cows, a first plurality of pivoting entry panel means provided in one side of said structure in spaced relationship along said first entry and a second plurality of pivoting entry panel means provided in the opposite side of said structure in spaced relationship along said second entry, said first and second plurality of pivoting entry panel means adapted to open and define a first plurality of spaced milking locations in said one side of said structure communicating with said first entry and a second plurality of spaced milking locations in said opposite side of said structure communicating with said second entry, responsive to the passage of cows through said first entry and said second entry in sequence, respectively, between said first plurality of entry panel means into said first plurality of spaced milking locations and between said second plurality of entry panel means into said second plurality of spaced milking locations, respectively; a first plurality of roll gates defining one end of said first plurality of spaced milking locations and a second plurality of roll gates defining one end of said second plurality of spaced milking locations, said roll gates horizontally mounted in said structure for rotation in concert between a vertically closed position for containing the cows in said first plurality of milking locations and said second plurality of milking locations, respectively, and a horizontally open position for releasing the cows from said first plurality of milking locations and said second plurality of milking locations, respectively.

26. The double-entry rapid exit parlor system of claim 25 further comprising a pair of collecting troughs extending in spaced relationship in said structure rearwardly of each of said first plurality of milking locations and said second plurality of milking locations, respectively, for collecting waste from the cows.

27. The double-entry rapid exit parlor system of claim 26 further comprising drive means operably connected to said first plurality of roll gates and said second plurality of roll gates for rotating said roll gates in concert into a selected one of said closed position and said open position.

28. The double-entry rapid exit parlor system of claim 27 further comprising a plurality of divider boards provided in said structure in spaced relationship, said divider boards spacing a selected number of said pivoting entry panel means and said milking locations and releasing the cows from said selected number of said milking locations responsive to operation of said roll gates.

29. The double-entry rapid exit parlor system of claim 28 wherein said pivoting entry panel means each further comprises a plurality of entry panel posts pivotally carried by said structure and entry panels fixedly attached to said entry panel posts, respectively, whereby said entry panels are pivoted from a closed position to an open position with respect to said structure responsive to contact with said entry panels by a cow entering said milking locations, respectively.

30. The double-entry rapid exit parlor system of claim 29 wherein said first plurality of roll gates are arranged in side-by-side relationship along said one side of said structure and said second plurality of roll gates are arranged in side-by-side relationship along said opposite side of said structure and said roll gates are each further characterized by a generally Z-shaped frame, a bar extending centrally through said frame and a roll gate rod projecting through said bar and secured to said bar, said rod also connected to said drive means, whereby rotation of said roll gate rod causes rotation of said bar and said frame responsive to operation of said drive means.

31. The double-entry rapid exit parlor system of claim 29 further comprising a pair of panel rotating rods slidably carried by said structure in close proximity to said entry panel posts, respectively; a post rod fixedly attached to each of said entry panel posts; a post chain connecting said post rod and one of said panel rotating rods in spaced relationship, respectively; and a pair of air cylinder means carried by said structure in spaced relationship, said air cylinder means operably connected to said panel rotating rods, respectively, for slidably moving said panel rotating rods, tensioning said post chain and rotating said entry panel posts and said entry panels into the closed configuration responsive to operation of said air cylinder means.

32. The double-entry rapid exit parlor system of claim 31 wherein said first plurality of roll-gates are arranged in side-by-side relationship along said one side of said structure and said second plurality of roll gates are arranged in side-by-side relationship along said opposite side of said structure and said roll gates are each further characterized by a generally Z-shaped frame, a bar extending centrally through said frame and a roll gate rod projecting through said bar and secured to said bar, said rod also connected to said drive means, whereby rotation of said roll gate rod causes rotation of said bar and said frame responsive to operation of said drive means.

* * * * *